United States Patent
Memmen

(10) Patent No.: US 9,506,350 B1
(45) Date of Patent: Nov. 29, 2016

(54) TURBINE ROTOR BLADE OF THE SPAR AND SHELL CONSTRUCTION

(71) Applicant: Robert L Memmen, Stuart, FL (US)

(72) Inventor: Robert L Memmen, Stuart, FL (US)

(73) Assignee: S&J DESIGN, LLC, Jupiter, FL (US)

( * ) Notice: Subject to any disclaimer, the term of this patent is extended or adjusted under 35 U.S.C. 154(b) by 0 days.

(21) Appl. No.: 15/009,940

(22) Filed: Jan. 29, 2016

(51) Int. Cl.
| | | |
|---|---|---|
| *F01D 5/18* | (2006.01) | |
| *F01D 5/14* | (2006.01) | |
| *F01D 5/28* | (2006.01) | |
| *B23P 15/04* | (2006.01) | |

(52) U.S. Cl.
CPC ............ *F01D 5/147* (2013.01); *B23P 15/04* (2013.01); *F01D 5/18* (2013.01); *F01D 5/28* (2013.01); *F01D 5/284* (2013.01); *F05D 2220/323* (2013.01); *F05D 2230/21* (2013.01); *F05D 2240/30* (2013.01); *F05D 2260/30* (2013.01); *F05D 2300/175* (2013.01); *F05D 2300/176* (2013.01); *F05D 2300/182* (2013.01); *F05D 2300/2283* (2013.01)

(58) Field of Classification Search
CPC .......... F01D 5/147; F01D 5/28; F01D 5/284; F01D 5/18; B23P 15/04; F05D 2230/21; F05D 2240/30; F05D 2260/30; F05D 2300/174; F05D 2300/175; F05D 2300/176; F05D 2300/182; F05D 2300/2283; F05D 2230/23; F05D 2230/237; F05D 2230/238; Y10T 29/49343; Y10T 29/49339; Y10T 29/49341

See application file for complete search history.

(56) References Cited

U.S. PATENT DOCUMENTS

| | | |
|---|---|---|
| 4,376,004 A | 3/1983 | Bratton et al. |
| 4,480,956 A | 11/1984 | Kruger et al. |
| 6,224,339 B1 | 5/2001 | Rhodes et al. |
| 7,080,971 B2 | 7/2006 | Wilson et al. |
| 7,435,058 B2 | 10/2008 | Campbell et al. |
| 8,007,242 B1 | 8/2011 | Brown et al. |
| 8,015,705 B2 | 9/2011 | Wilson, Jr. et al. |
| 8,052,391 B1 | 11/2011 | Brown |
| 8,070,450 B1 | 12/2011 | Ryznic et al. |
| 8,336,206 B1 | 12/2012 | Brown et al. |
| 8,382,439 B1 | 2/2013 | Brown |

*Primary Examiner* — Richard Edgar
*Assistant Examiner* — Jesse Prager
(74) *Attorney, Agent, or Firm* — John Ryznic

(57) ABSTRACT

A turbine rotor blade of the spar and shell construction, where a one piece shell is secured to a hollow spar using a plurality of chordwise extending shear ties that are cast into a space formed between the shell interior and the spar exterior. A fill pipe is inserted into the hollow spar and is used to deliver the liquid retainer material to the hard to reach slots formed in which the shear ties solidify.

12 Claims, 3 Drawing Sheets

TURBINE ROTOR BLADE OF THE SPAR AND SHELL CONSTRUCTION

CROSS-REFERENCE TO RELATED APPLICATIONS

None.

GOVERNMENT LICENSE RIGHTS

None.

BACKGROUND OF THE INVENTION

Field of the Invention

The present invention relates generally to a turbine rotor blade of a gas turbine engine, and more specifically to a turbine rotor blade having a spar and shell construction that can be easily assembled and disassembled.

Description of the Related Art Including Information Disclosed Under 37 CFR 1.97 and 1.98

In a gas turbine engine, a hot gas stream is passed through a turbine to drive a fan or an electric generator to power an aircraft in an aero gas turbine engine or to produce electrical power in the case of an industrial gas turbine engine. An efficiency of the engine can be increased by passing a higher temperature gas into the turbine. However, the turbine inlet temperature (TIT) is limited to the material properties of the turbine such as the turbine stator vanes and the rotor blades. Internal cooling of the vanes and blades of the turbine is done to allow for gas stream temperatures higher than the melting point of the airfoils. A typical turbine airfoil (blade or vane) is made from a nickel alloy which has high temperature resistance as well as high strength for use in a turbine. A nickel alloy rotor blade is formed as a single solid piece with internal cooling passages formed from an investment casting process. Stator vanes are also formed from casting a nickel alloy but with impingement cooling inserts added after the vane is cast. However, turbine inlet temperatures have reached a limit using these nickel alloy materials with airfoil cooling.

Recently the turbine rotor blade is formed from a spar and shell construction in which a shell is secured to a spar to form the rotor blade. With the spar and shell construction, the shell can be made from a different material than the spar. Thus, the shell can be formed from a higher temperature resistant material than that of the spar. The spar takes all the load from the shell so that the shell can be made mostly for high temperature resistance than for high stress resistance. With the spar and shell construction, the shell can be formed from a ceramic material or even a refractory metal such as molybdenum. One major problem with the spar and shell constructed turbine rotor blade is in the assembly or disassembly of the shell from the spar and of retaining the shell to the spar against the high centrifugal loads due to the rotation of the rotor blade.

Single crystal metals have been used for turbine rotor blades because of their high stiffness against centrifugal loads. To continue to increase the turbine inlet temperature beyond the current single crystal material capability different materials systems needs to be utilized. Ceramic materials and refractory alloys have higher use temperatures but do not have the tensile strength to be self-supporting at the rotational speeds and temperatures that are desirable. These materials could be used as a closeout for the airfoil if they could be kept in a compressive state or in a partially compressive and mild tensile state. This can be achieved by restraining the shell at the outer edge of the airfoil via a shelf that is attached to the tensile member called the spar which is internal to the shell. There is a practical limit to the speed and consequently the pull exerted on the spar because the entire load of the shell must be taken out at the tip and then this load transitioned inboard to the blade attachment.

BRIEF SUMMARY OF THE INVENTION

A spar and shell turbine rotor blade where the spar and shell are fabricated separately of differing materials and joined and made inseparable by the use of cast in place shear ties. The shell is fabricated by forming a hollow casing with the outside contour conforming to the desired airfoil contour. The wall thickness of the shell is controlled in order to keep the resultant stresses in an acceptable range for the material but is kept as thin as possible. The material of the shell could be silicon nitride, titanium aluminide, nickel aluminide, or one of the refractory alloys. The shell has an integral tip cap which forms a cavity that is closed at the end. The exterior surface is smooth for aerodynamic reasons and the inside has features at the tip for locking the shell to the spar and also has channels spaced radially also on the inside surface. The protrusions from the tip and the wall channels will provide the means for shearing the compressive load in the shell into the support structure of the spar. Conventional fabrication methods are used to make the shell.

The spar is fabricated conventionally from a superalloy such as cast IN100 or CM247 or one of the single crystal alloys and will carry the entire radial load of the airfoil to below the platform and through the attachment into the disk. The tip section has recesses for trapping the protrusions at the tip of the spar and channels which match the location of the channels on the shell when the spar is fully inserted into the shell. The spar wall is tapered from narrow at the tip too thick at the root in order to carry the progressively increasing load sheared in from the shell.

After the spar is fabricated a pipe or sprue is inserted into tapered channels formed in the spar walls and leading into the outward facing channels. This sprue is for the purpose of introducing material into the closed regions formed by the shell and spar matching channels and the tip region mating locks.

After the spar is fully inserted into the shell and secured, the locking shear material is poured into the sprue and by means of either positive pressure, vibration or centrifugal load caused to flow and fill all of the channels for purposes of locking the spar and shell together. This locking material can be a number of different viscous materials which could be caused to flow into and fill these cavities. The preferred material is a mixture of high temperature ceramics reinforced with chopped alumina or carbon fiber. A molten alloy could be used but would introduce the complication of elevating the temperature of the parts while pouring. After solidification of the shear ties the sprue will be removed along with excess lock material in order to keep the structure as light as possible.

DETAILED DESCRIPTION OF THE INVENTION

The present invention is turbine rotor blade for use in a gas turbine engine where the rotor blade is formed from a spar and shell construction so that the shell can be formed from a high temperature resistant material. A one piece shell is secured to a one piece spar using shear ties that are cast in place when the shell is positioned over the spar. A fill pipe or sprue is used to channel the shear tie material from outside of the blade to spaces formed between the shell and the spar that form the shear ties when the material has solidified.

Figure 1:
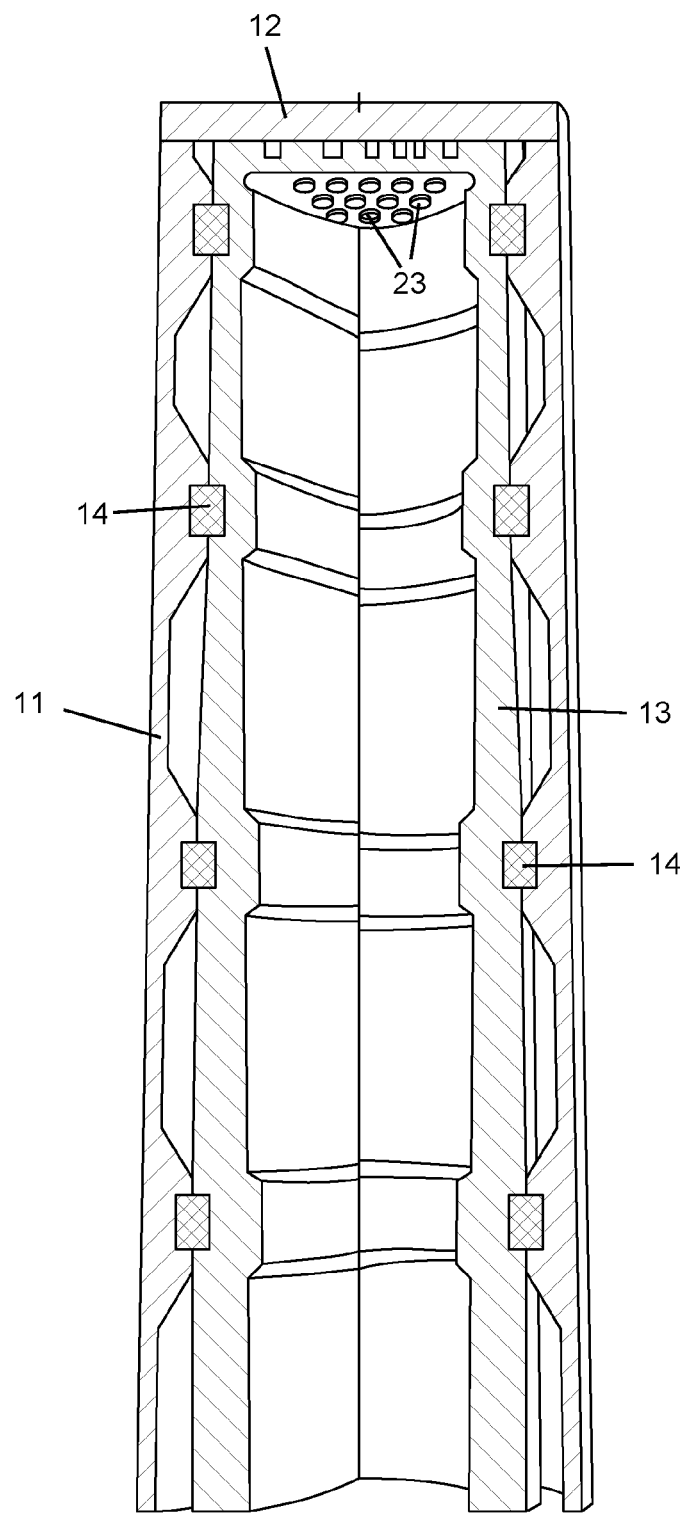
FIG. 1 shows a cross section through the turbine rotor blade of the present invention.

FIG. 1 shows a cross section of the turbine rotor blade of the present invention with the shell positioned over the spar. The shell 11 is fabricated by forming a hollow casing with the outside contour conforming to the desired airfoil contour. The wall thickness of the shell 11 is controlled in order to keep the resultant stresses in an acceptable range for the material but is kept as thin as possible. The shell 11 is a one-piece shell made from a relatively high temperature resistant material such as a silicon nitride, titanium aluminide, nickel aluminide, or one of the refractory alloys such as molybdenum. The spar 13 is a hollow spar that can be made from a lower temperature resistant material than the shell such as a superalloy like cast IN100 or CM247 or one of the single crystal alloys that is capable of withstanding the entire radial load of the shell. The shell 11 can include an integral tip cap 12 or one that is formed separately and then secured to the tip end of the hollow shell 11. The shell 11 is secured to the spar 13 using cast in place shear ties 14. The tip end of the spar 13 and tip cap 12 are also secured together by the cast in place material that forms the shear ties 14.

Figure 2:
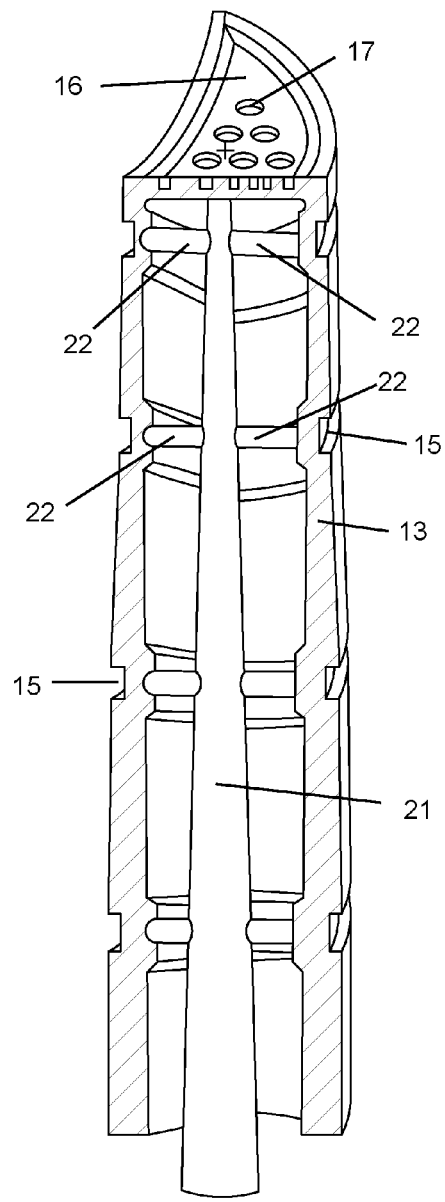
FIG. 2 shows a cross section of the spar with a fill pipe or sprue of the turbine rotor blade of the present invention.

FIG. 2 shows the spar 13 with a tip end 16 having a number of holes or tip locking holes 17 that open into the hollow section of the hollow spar 13. An external side of the spar 13 includes a plurality of chordwise extending channels or slots 15 that form the spaces for the cast in place shear ties 14. A fill pipe or sprue 21 includes a main channel with a number of branches 22 that open into the spaces formed for the cast in place shear ties 14. The branches have openings on the ends that are aligned with holes in the spar that open into the channels 15 formed in the spar 13. In the embodiment of FIG. 2, the spar is secured to the spar using four cast in place shear ties 14 extending on the pressure side and the suction side of the blade.

Figure 3:
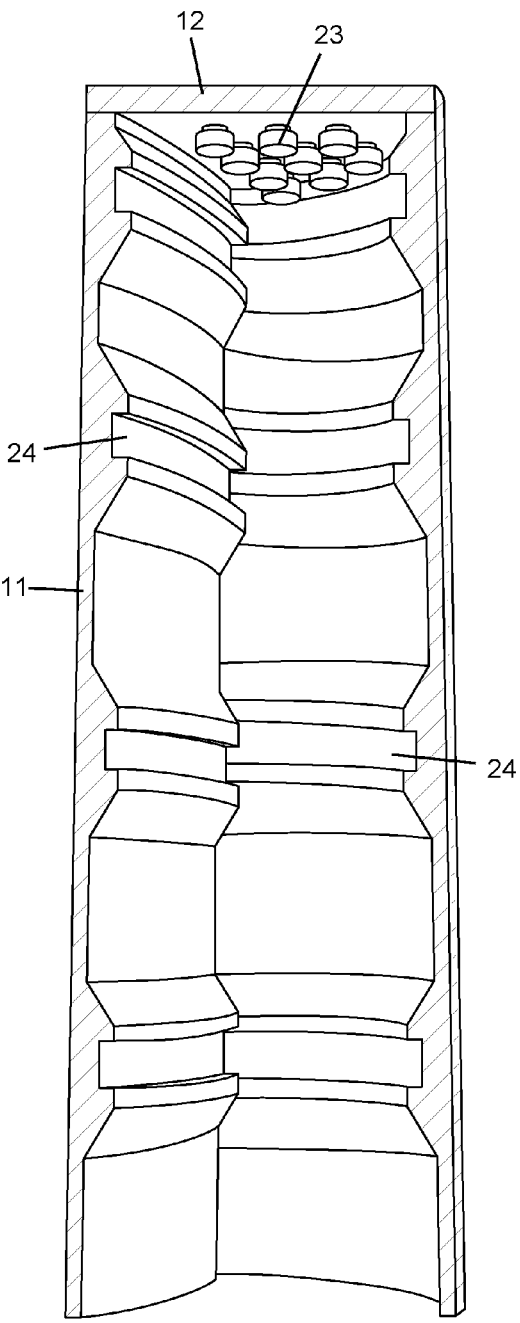
FIG. 3 shows a cross section of the shell of the turbine rotor blade of the present invention.

FIG. 3 shows an inside view of the shell 11 with four chordwise extending channels 24 that aligned with the four chordwise extending channels 15 in the spar 13 to form the spaces for the cast in place shear ties 14. The tip cap 12 includes a plurality of tip locking projections 23 that extend from a bottom side of the tip cap and pass through the tip locking holes 17 in the tip end 16 of the spar 13. When the spar 13 is positioned in place in the shell 11 and the locking material is injected into the space, the locking material will solidify around the projections 23 extending out from the bottom of the holes 17 and lock the tip ends of the spar 13 and shell 11 together.

Figure 4:
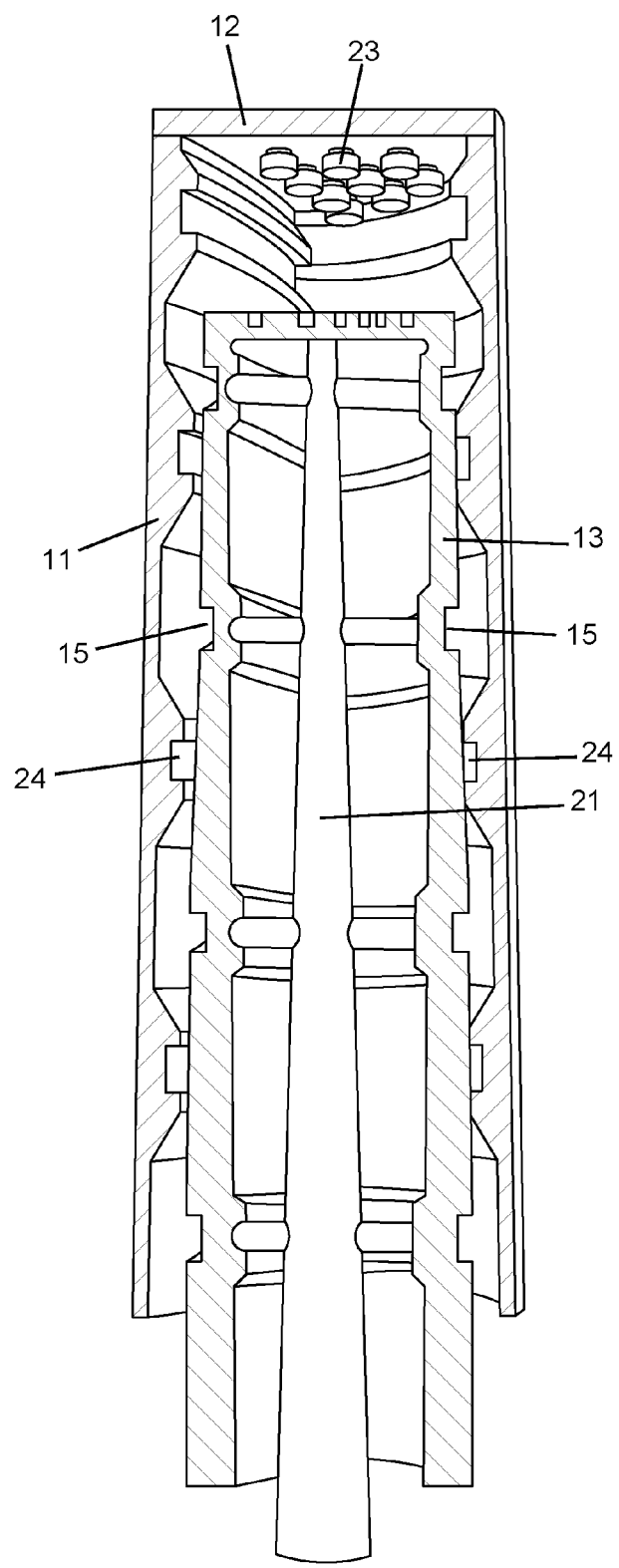
FIG. 4 shows a cross section of the spar and the fill pipe or sprue being inserted into the hollow shell of the turbine rotor blade of the present invention.

FIG. 4 shows the fill pipe or sprue 21 positioned in place within the spar 13 with the spar being inserted into the hollow section of the shell 11. The fill pipe 21 is used to channel a material that is injected into the spaces formed by the channels 15 and 24 that form the spaces for the shear ties 14. The material is passed through the main channel 21 of the fill pipe and flows through the side branches 22 and then into the spaces formed by the channels to form the shear ties 14. The space formed between the tip cap and the tip end of the spar 13 is also supplied with the material through the top end of the main branch 21 to fill the space around the tip locking projections 23 extending from the tip cap 12. The material flows through the tip locking holes 17 formed in the tip end of the spar 13 to fill this space by the use of either pressure, vibration or centrifugal load. When the material that forms the shear ties 14 has solidified, the fill pipe 21 can be broken free and removed from the blade or left in place.

The spar 13 is tapered from narrow at the tip end to thicker at the root end in order to carry the progressively increasing load sheared in from the shell 11. The locking material for the shear ties 14 can be a mixture of high temperature ceramics reinforced with chopped alumina or carbon fibers. A molten alloy could also be used but would introduce the complication of elevating the temperature of the parts while pouring. After solidification of the shear tie material, the sprue or fill pipe can be removed along with excess locking material in order to keep the blade as light as possible.

I claim the following:

1. A process of forming a turbine rotor blade for a gas turbine engine, the process comprising the steps of:
    forming a single piece hollow shell with an outer surface having an airfoil shape and an inner surface having a plurality of chordwise extending slots;
    forming a hollow spar with an outer surface having a plurality of chordwise extending slots;
    placing a fill pipe having a main channel and a plurality of branch channels into positioned within the spar so that the branch channels open into the chordwise extending slots;
    placing the spar and fill pipe within the hollow shell so that the chordwise extending slots form spaces for a shear tie; and,
    passing a shear tie forming material through the fill pipe to fill the spaces with a material that solidifies into shear ties to secure the shell to the spar of the turbine rotor blade.

2. The process of forming the turbine rotor blade of claim 1, and further comprising the step of:
    forming the shell as a one-piece shell with an integral tip cap.

3. The process of forming the turbine rotor blade of claim 1, and further comprising the step of:
    forming the shell from a silicon nitride, or from titanium aluminide, or from nickel aluminide, or from a refractory alloy.

4. The process of forming the turbine rotor blade of claim 1, and further comprising the step of:
    after the shear tie forming material has solidified, removing the fill pipe from the spar.

5. The process of forming the turbine rotor blade of claim 1, and further comprising the step of:
    forming the spar with a tapered thickness with a narrow tip end and a thicker root end.

6. The process of forming the turbine rotor blade of claim 2, and further comprising the steps of:
    forming a plurality of tip locking features on a bottom side of the tip cap; and,
    filling a space formed around the tip locking features with the shear tie forming material to lock the tip end of the spar to the tip floor.

7. The process of forming the turbine rotor blade of claim 2, and further comprising the steps of:

forming a tip locking hole on a tip end of the spar;

forming a tip locking projection on a bottom side of the tip cap of the shell;

passing the tip locking projection through the tip locking hole when the shell is positioned in place over the spar; and, filling a space formed around the tip locking projection to lock the tip cap to the spar.

8. A turbine rotor blade for a gas turbine engine, the turbine rotor blade comprising:

a single piece shell having an airfoil shape with a pressure side wall and a suction side wall and a tip cap;

a hollow spar having a similar airfoil shape with a pressure side wall and a suction side wall and a tip end;

a plurality of chordwise extending slots formed on the shell;

a plurality of chordwise extending slots formed on the spar;

the plurality of chordwise extending slots on the shell and the spar forming a plurality of chordwise extending shear tie channels; and, a shear tie formed from a castable material in each of the chordwise extending shear tie channels.

9. The turbine rotor blade of claim 8, and further comprising:

a fill pipe located within the hollow spar and connecting an external opening to each of the chordwise extending shear channels such that a liquid retainer material can be delivered to each of the chordwise extending shear tie channels to lock the shell to the spar.

10. The turbine rotor blade of claim 8, and further comprising:

the tip cap of the shell includes a tip locking projection extending from a bottom of the tip cap;

the tip end of the spar has a tip locking hole aligned with the tip locking projection when the shell is positioned over the spar; and, a tip locking retainer formed from a castable material around the tip locking projection.

11. The turbine rotor blade of claim 8, and further comprising:

the shell is formed from silicon nitride, or from titanium aluminide, or from nickel aluminide, or from a refractory alloy.

12. The turbine rotor blade of claim 8, and further comprising:

the hollow spar is tapered from narrow at the tip end and progressively increasing toward root end.

* * * * *